DIGITAL-ANALOG CONVERTER

Filed Nov. 3, 1958

INVENTOR.
BYARD G. NILSSON
BY Gulwider Mattingly & Huntley

United States Patent Office
3,030,618
Patented Apr. 17, 1962

3,030,618
DIGITAL-ANALOG CONVERTER

Byard G. Nilsson, 4448 Ranchview Road, Rolling Hills, Calif.

Filed Nov. 3, 1958, Ser. No. 771,465
7 Claims. (Cl. 340—347)

Automatic control systems which employ electrical signals often sense phenomena as temperature, volume, light intensity, etc. in the form of an electrical analog signal. That is, a phenomena is manifest by an electrical signal the amplitude of which is indicative of degree.

In the processing of data as represented by electrical signals, better accuracy has been attained by employing machines which represent values digitally. If digital computing equipment is employed in an automatic control system, data represented by an analog signal must be converted to a digital form, and an analog-digital converter is required.

Various forms of analog-digital converters have been proposed; however, in general, these systems have been complex and expensive. The present invention is an improved analog-digital converter which registers an analog signal and diminishes the registered value thereof as individual digital register stages are set in sequence, whereby when the registered analog value is reduced to zero, and the stages of the digital register are set to indicate the analog value. The details of this invention are set forth below with reference to the accompanying drawing in which.

Figure 1:
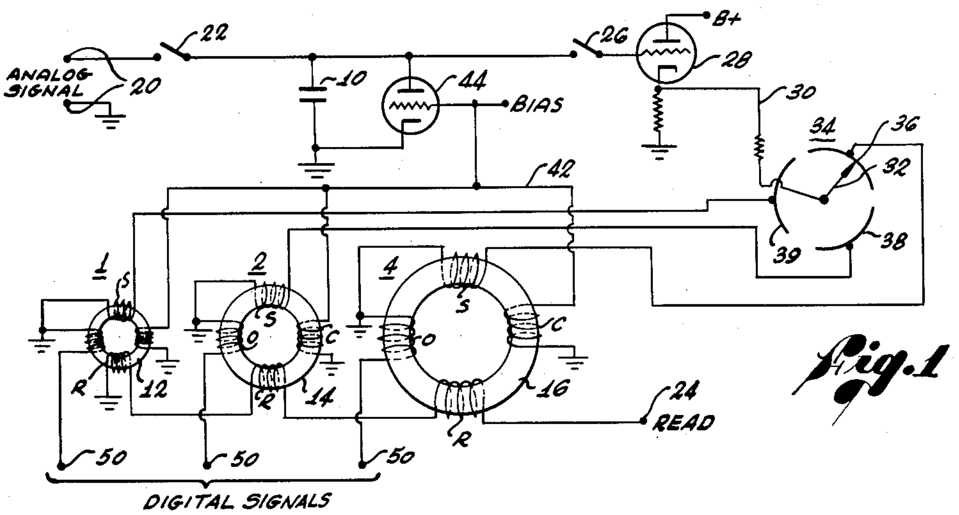
FIGURE 1 is a diagrammatic representation of one embodiment of the present invention.

Referring first to FIGURE 1 there is shown a condenser 10 which comprises an analog register. The condenser 10 has a very low leakage current and is capable of sustaining a charge for relatively long intervals of time.

A group of magnetic cores 12, 14 and 16 comprise the stages of a binary digital register in the system of FIGURE 1. The number of cores varies according to the character capacity of the binary register, e.g. three cores are adequate to register three binary bits. The core 16 is physically the largest core and registers a binary bit having a decimal significance of four. Core 14 is smaller and registers bits equivalent to decimal two, while core 12 is still smaller and registers bits equivalent to decimal one.

The cores may be formed of ferrite material having a relatively-rectangular hysteresis loop. The cores have two stable magnetic states which may be considered a positive or set state and a negative or reset state. The core 16, being larger in size, requires a more intense magnetizing force than the smaller core 14 in order to be changed from one stable magnetic state to the other stable magnetic state. Therefore, in view of the different size of the cores 12, 14 and 16, the magnetizing force required to change the state of these cores is indicative of the significance of the character which the cores register. Of course, the cores may be variously arranged in different combinations in accordance with well known binary codes; however, the three cores 12, 14 and 16, register decimal values of one, two and four, respectively, in accordance with standard binary-code techinque.

In general, the system of FIGURE 1 operates by first registering an analog signal in the form of an electrical charge on the condenser 10. The amplitude of the charge registered on the condenser 10 is then tested to determine whether or not it is great enough to alter the state of the core 16. In the event the charge is large enough to alter the state of the core 16, the core is altered in state thereby registering a digital character. Alteration of the state of the core 16 in turn reduces the charge of the condenser 10 proportionately to the weighted value of the digital character registered by the core 16.

Thereafter, the remaining cores, e.g. cores 14 and 12, are considered in sequence and are either set or not set in accordance with the value of the analog signal registered by the condenser 14.

The operation of the system of FIGURE 1 may now best be considered by assuming certain initial conditions and introducing the components of the system as the description of the operation proceeds.

Preparatory to a conversion operation the stages of the digital register comprising cores 12, 14 and 16 are placed in a negative or reset magnetic state by applying a direct-current voltage at the terminal 24 to cause a current through the serially-connected read windings R of the cores 12, 14 and 16, which current is adequate to place the cores in a reset or negative, zero-indicating state. The voltage at the terminal 24 is thereafter removed.

Now assume the existence of an analog signal at terminals 20 so that upon closure of a switch 22, the condenser 10 is charged to register the value X of the analog signal.

Next, the switch 22 is opened and a switch 26, connected between the condenser 10 and the control grid of an electron tube 28, is closed. The electron tube 28 is connected in a cathode-follower configuration and provides an output signal in a conductor 30 which represents the charge registered on the condenser 10. The conductor 30 is connected to the movable contact 32 of a distributor or commutator 34 including segments 36, 38 and 39 which are sequentially engaged by the revolving contact 32. The commutator 34 may take the form of a mechanical or electronic apparatus.

The segments 36, 38 and 39 are individually connected through set windings S of cores 16, 14 and 12, respectively, to ground.

When the system is operated to perform a conversion, the contact 32 in the commutator 34 first engages the segment 36 to provide a current through the set winding S on the core 16 which is proportional to the charge registered on the condenser 10. If the charge registered on the condenser 10 exceeds a value of decimal four, the current through the set winding S on core 16 is adequate to alter the magnetic state of the core 16 to a positive or digit-indicating state.

Assuming a change to the set state by the magnetic core 16, a voltage is induced in each of the other windings on the core 16, including the control winding C thereon. The voltage induced in the control winding C is applied through a conductor 42 to the control grid of an electron tube 44. The induced voltage in the control winding C on the core 16 is in the form of an electrical pulse and upon application to the control grid of the tube 44 renders the tube 44 conductive to permit a predetermined amount of discharge by the condenser 10. The extent to which the condenser 10 is discharged is made such that the voltage across the condenser 10 is reduced by an amount coinciding to decimal four in the analog scale employed. Therefore, the signal applied to the control grid of the tube 28 is reduced as is the signal appearing in the conductor 30 to an analog value of X–4.

As the operation of the system continues, the movable contact 32 in the commutator 34 moves to dwell upon the segment 38, causing a current to flow through the set winding S of the core 14. Assume now that the analog signal registered by the condenser 10 has a value less than decimal two and therefore the current passing through the set winding S of the core 14 is not adequate to cause the core 14 to change from a zero-indicating reset state to a digit-indicating set state. In this event, the state of the core 14 remains unchanged as does the analog signal registered on the condenser 10.

The operation of the system continues and the cores are either altered in state or left unaltered. Each time one of the cores is changed to a digit-indicating or positive state, a voltage is induced in the control winding C associated with the core thereby driving the tube 44 into conduction to permit a predetermined amount of charge to be removed from the condenser 10. It is to be noted that, in view of the relative size of the cores, the greater currents in the set windings result in greater voltages in the control windings which in turn determine the amount of conduction through the tube 44 and the amount of charge removed from the condenser 10.

Upon the completion of the sequential operation described above for each core in the digital register, the charge on the condenser 10 is substantially reduced to zero and the cores are set to indicate a binary digital number. In order to manifest the numerical value registered in the cores, a pulse is applied to the terminal 24 causing a current through the read windings R adequate to change the state of the cores in a one-indicating set state to a zero-indicating reset state. The cores which undergo such a change induce a voltage in the output winding O thereof and these voltages appear in the form of digital signals at terminals 50 to indicate a binary numerical value in the conventional manner.

Figure 2:
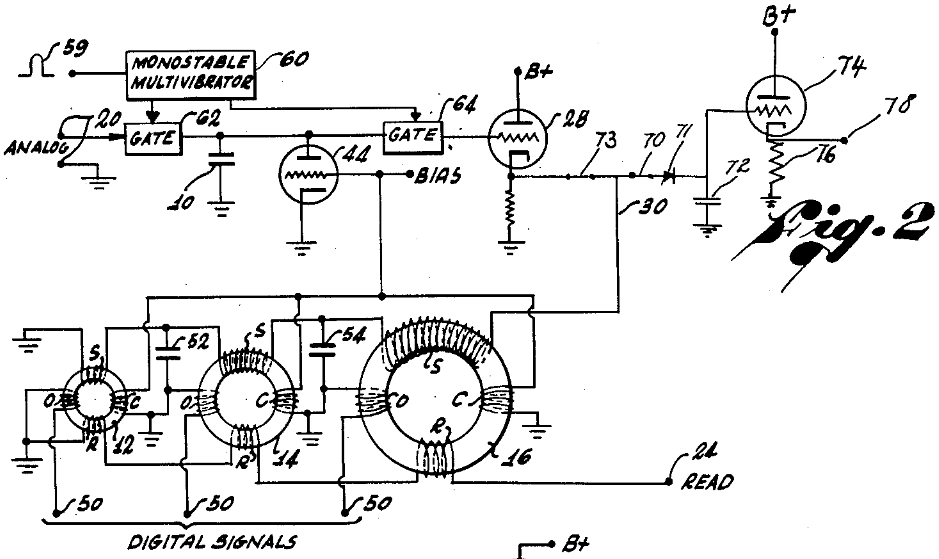
FIGURE 2 is a diagrammatic representation of another embodiment of the present invention.

Referring now to FIGURE 2, in which components similar to those of FIGURE 1 are similarly identified, an alternative embodiment of the present invention is shown. In the system of FIGURE 2, the electronic commutator is omitted and the sequence of comparisons between the cores and the charge on the condenser 10 is effected by connecting the set windings S of the cores in conjunction with condensers 52 and 54 to form an electronic delay line. Furthermore, the switching operation for charging and maintaining the charge on the condenser 10 is performed somewhat automatically.

Considering the operation of the system of FIGURE 2 in detail, assume the cores are in a cleared or negative state and an analog signal exists at the terminals 20. A pulse 59 is now applied to a monostable multivibrator 60 causing the multivibrator to provide a high value of a two-state signal to a gate circuit 62 (short circuit when qualified, open circuit when disqualified) and a low value of a two-state signal to a similar gate circuit 64. During a brief interval after the occurrence of the pulse 59, the multivibrator 60 qualifies the gate 62 allowing the analog voltage at the terminals 20 to charge the condenser 10. During this interval, the gate 64 is disqualified, i.e., presents an open circuit, so that the analog signal is not applied to the grid of the cathode-follower tube 28.

At the expiration of the interval timed by the multivibrator 60, the state of the signals applied to the gate circuits 62 and 64 is reversed and the gate 62 is disqualified while the gate 64 is qualified. Therefore, the signal in the output conductor 30 from the cathode-follower tube 28 promptly rises to indicate the charge on the condenser 10 causing a current to flow through the serially-connected set windings S on the cores 16, 14 and 12 which are connected in conjunction with condensers 52 and 54 as an electric delay line.

The current is initially greatest in the set winding S of the core 16. Therefore, the ampere-turns or magnetizing force effected by the current through the conductor 30 is first sensed by the core 16. In the event that the intensity of the magnetizing force is great enough to alter the state of the core 16 then the core is set to a digit-indicating state to induce a voltage in the control winding C on the core 16 and thereby render the tube 44 conductive to discharge the condenser 10 a predetermined amount.

According to the operation of the system, each of the set windings S associated with the cores sequentially receives the full impact of the current or signal that remains indicative of the charge on the condenser 10. Therefore, when the current through the set winding S of the last core in the register, e.g. core 12, is stable, each of the cores will either have been set to a positive state or left in a negative state and thereby present either digits or zeros representative of a binary numerical value. With cores in the various states the binary signals indicative of the numerical value are caused to appear at the output terminals 50 by applying the voltage to the read terminal 24 whereby to reset the cores to a negative state.

It is to be noted that the various windings, for example the set windings S on the cores, may include a different number of turns. For example, in the embodiment of FIGURE 2, it will normally be desirable to compensate for the size of the cores to a certain extent by providing the winding S on the core 16 with a greater number of turns than the other windings and diminishing the number of windings as the size of the cores similarly diminish.

Figure 3:
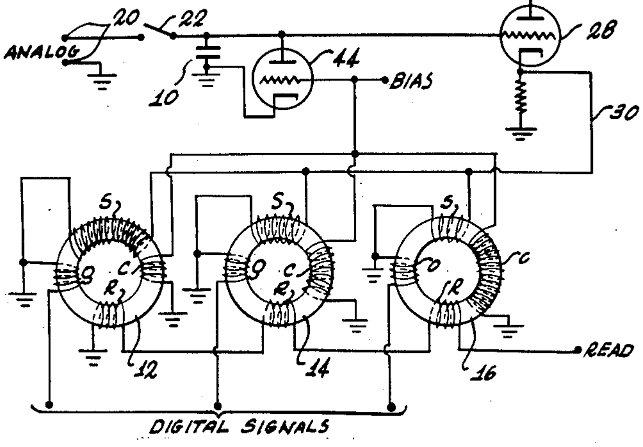
FIGURE 3 is a diagrammatic representation of still another embodiment of the present invention.

Referring now to FIGURE 3, there is shown still another embodiment of the present invention, and elements previously discussed which are shown in FIGURE 3 are identified by previously-used reference numerals. In the system of FIGURE 3, the sequential mode of operation is effected by varying the amount of inductance in the set windings S which are all connected in parallel. Specifically, after the switch 22 has been closed and opened to thereby register the analog signal on the capacitor 10, and the cathode follower tube 28 provides a representative signal in the conductor 30, the relatively low inductance presented by the few turns comprising the set windings S on the core 16 allows the current through the winding to rise very rapidly. As a result, the core 16 is the first of the cores to receive the magnetizing force as a result of the voltage at the cathode of the tube 28. In the event the voltage is great enough to provide a magnetizing force from the set windings S adequate to change the state of the core 16, of course, the state is changed and a voltage is induced in the control winding C to pulse the tube 44.

It is to be noted, that while the set winding S on the core 16 is relatively small, i.e. includes a lesser number of turns, the control winding C on the core 16 is relatively large. This variation in size compensates for the fact that the cores 12, 14 and 16, in the embodiment of FIGURE 3 are of similar size; therefore, the ampere-turns between the set windings S and control windings C is balanced whereby to control the proper pulsing of the tube 44 to permit a predetermined amount of discharge by the condenser 10.

After current through the set winding S on the core 16 reaches a stable state, the current in the set winding S on the core 14 will reach a stable state and the sequence of operation will continue whereby to sequence the testing of the cores, to change the state or not change the state depending upon the remaining charge on the condenser 10.

Embodiments of the present invention may be adapted for operation as an analog-digital converter which converts digital signals into an analog equivalent. An illustrative form of such system is shown in FIGURE 2, a portion of which has not been described above. The conductor 30 is connected through a normally open switch 70 and a diode 71 to a grounded condenser 72 and the grid of a tube 74. The anode of the tube 74 is connected to positive potential and the cathode is connected through a resistor 76 to ground. Thus, the tube 74 is connected in a cathode-follower configuration and serves in conjunction with the condenser 72, as an analog register capable of registering and manifesting an analog signal at terminal 78. The condensers 52 and 54 may be eliminated from this embodiment.

In the operation of the system to convert digital signals into an analog equivalent, digital signals are applied to terminals 50, either sequentially or simultaneously to set the cores 12, 14 and 16 to represent a value. Next, the normally-open switch 70 is closed, the normally-closed switch 73 is opened, and a voltage adequate to reset all the cores is applied at the terminal 24. Resetting the set cores results in induced voltages in the set windings S which are proportional to the significance of the digitally-registered value. These voltages are accumulated on the condenser 72 to control the current through the tube 74 and thereby set the analog output signal appearing at the terminal 78.

One feature of this invention resides in the consideration that a plurality of digital registers capable of providing signals proportional to the quantity they register, serve to provide an accumulated analog signal representative of a digitally-registered value.

An important feature of the present invention resides in the consideration that an analog signal is registered in such a manner as to be repeatedly compared with the weighted value of the stages of the digital register; and, the signal registered in the analog register diminished in accordance with whether or not the stages of the digital register are changed to indicate the presence of a character therein.

From the foregoing it will be apparent to those skilled in the art that the present invention provides a greatly improved and satisfactory analog-digital converter. Furthermore, it will be apparent that the system is capable of many variations and modifications; consequently, the present invention is not to be limited to the particular ar-arrangements herein shown and described except as defined by the appended claims.

I claim:

1. An analog-digital converter for translating an analog signal representative of a numerical value into a representative group of binary digital signals, comprising: an analog register for storing an analog signal; a plurality of magnetic-core binary registers, each for registering a different binary digit of said numerical value, each of said magnetic-core registers requiring a different predetermined level of signal magnitude to change in state and register a binary digit; means for seqentially testing, during separate operating intervals, the analog signal stored in said analog register against the signal magnitudes, in declining order, required to register a binary digit in each of said magnetic-core registers, whereby to register binary digits in said magnetic-core registers during said separate operating intervals upon the occurrence of a signal stored in said analog register which is as great as the predetermined signal magnitude for said registers; and means controlled by said magnetic-core registers for reducing the value of the analog signal registered in said analog register by an amount coinciding to said predetermined level of signal magnitude for each magnetic-core register, upon the registration of a binary digit in such register.

2. Apparatus according to claim 1 wherein said analog register comprises a capacitor.

3. Apparatus according to claim 1 wherein said means for sequentially testing comprises: means for forming an electrical signal current indicative of the value registered in said analog register, and a commutator for selectively applying said electrical current to said magnetic core registers during said sequential discrete intervals.

4. Apparatus according to claim 1 wherein said means for sequentially testing comprises: means for forming an electrical signal indicative of the value registered in said analog register; and an electric delay line including windings on said magnetic-core registers connected to receive said signal indicative of the value registered in said analog register.

5. Apparatus according to claim 1 wherein said means for sequentially testing comprises: means for forming an electrical signal indicative of the value registered in said analog register; and a plurality of different-size windings on said magnetic-core registers connected in parallel to receive said signal indicative of the value registered in said analog register.

6. Apparatus according to claim 1 wherein the cores of said magnetic-core registers require a different magnetizing force to effect a change in state.

7. Apparatus according to claim 1 wherein the windings on said magnetic-core registers include different numbers of turns.

References Cited in the file of this patent

UNITED STATES PATENTS

| | | |
|---|---|---|
| 2,244,257 | Maul | June 3, 1941 |
| 2,556,975 | Oberman | June 12, 1951 |
| 2,568,724 | Earp | Sept. 25, 1951 |
| 2,569,927 | Gloess | Oct. 2, 1951 |
| 2,570,221 | Earp | Oct. 9, 1951 |
| 2,616,965 | Hoeppner | Nov. 4, 1952 |
| 2,652,501 | Wilson | Sept. 15, 1953 |
| 2,715,724 | Oberman | Aug. 16, 1955 |
| 2,739,285 | Windsor | Mar. 20, 1956 |
| 2,754,503 | Forbes | July 10, 1956 |
| 2,784,396 | Kaiser | Mar. 5, 1957 |
| 2,787,418 | MacKnight | Apr. 2, 1957 |
| 2,828,482 | Schumann | Mar. 25, 1958 |
| 2,839,740 | Haanstra | June 17, 1958 |